United States Patent
Jung

(10) Patent No.: US 8,023,400 B2
(45) Date of Patent: Sep. 20, 2011

(54) APPARATUS AND METHOD FOR TRANSMITTING/RECEIVING AND RELAYING SIGNAL IN A COMMUNICATION SYSTEM USING DOFDM/DOFDMA

(75) Inventor: Young-Ho Jung, Goyang-si (KR)

(73) Assignee: University-Industry Cooperation Foundation of Korea Aerospace University, Goyang-si (KR)

( * ) Notice: Subject to any disclaimer, the term of this patent is extended or adjusted under 35 U.S.C. 154(b) by 121 days.

(21) Appl. No.: 12/489,687

(22) Filed: Jun. 23, 2009

(65) Prior Publication Data

US 2009/0323514 A1    Dec. 31, 2009

(30) Foreign Application Priority Data

Jun. 30, 2008  (KR) ........................ 10-2008-0063111

(51) Int. Cl.
*H04J 11/00*    (2006.01)
*H04B 7/14*    (2006.01)

(52) U.S. Cl. ........................ 370/210; 370/315; 370/338

(58) Field of Classification Search ........................ None
See application file for complete search history.

(56) References Cited

U.S. PATENT DOCUMENTS

| | | | |
|---|---|---|---|
| 2007/0160014 A1* | 7/2007 | Larsson ........................ | 370/338 |
| 2009/0040919 A1* | 2/2009 | Muharemovic et al. ...... | 370/210 |
| 2009/0040960 A1* | 2/2009 | Kim et al. ..................... | 370/315 |
| 2009/0073916 A1* | 3/2009 | Zhang et al. .................. | 370/315 |

* cited by examiner

*Primary Examiner* — Ricky Ngo
*Assistant Examiner* — Clemence Han
(74) *Attorney, Agent, or Firm* — Jefferson IP Law, LLP

(57) ABSTRACT

A signal transmission apparatus in a Double Orthogonal Frequency Division Multiplexing (DOFDM)/Double Orthogonal Frequency Division Multiple Access (DOFMA) communication system generates a first signal by performing row-wised Orthogonal Frequency Division Multiplexing (OFDM) on M sub-samples for each of N sub-carriers, generates a second signal by performing column-wised OFDM on the first signal generated for each of the N sub-carriers, and transmits the second signal to a signal reception apparatus. Here, N denotes a number of sub-carriers used in the DOFDM/DOFDMA communication system, and M denotes an integer greater than or equal to 1.

10 Claims, 5 Drawing Sheets

APPARATUS AND METHOD FOR TRANSMITTING/RECEIVING AND RELAYING SIGNAL IN A COMMUNICATION SYSTEM USING DOFDM/DOFDMA

PRIORITY

This application claims the benefit under 35 U.S.C. §119(a) of a Korean Patent Application filed in the Korean Intellectual Property Office on Jun. 30, 2008 and assigned Serial No. 10-2008-0063111, the entire disclosure of which is hereby incorporated by reference.

BACKGROUND OF THE INVENTION

1. Field of the Invention

The present invention relates to an apparatus and method for transmitting/receiving and relaying signals in a communication system using Double Orthogonal Frequency Division Multiplexing (DOFDM)/Double Orthogonal Frequency Division Multiple Access (DOFDMA) (hereinafter referred to as "DOFDM/DOFDMA communication system").

2. Description of the Related Art

Next-generation communication systems have developed to provide a variety of high-speed, high-capacity services to Mobile Stations (MSs). Particularly, the next-generation communication systems use Orthogonal Frequency Division Multiplexing (OFDM)/Orthogonal Frequency Division Multiple Access (OFDMA) to offer the high-speed, high-capacity services. A typical example of the next-generation communication systems using OFDM/OFDMA may include an Institute of Electrical and Electronics Engineers (IEEE) 802.16 communication system, a Mobile Worldwide Interoperability for Microwave Access (WiMAX) communication system, an IEEE 802.11 communication system and the like. The Mobile WiMAX communication system is a communication system based on the IEEE 802.16 communication system, and the IEEE 802.16 communication system represents a communication system using the IEEE 802.16 standard. In addition, the next-generation communication systems actively consider using a relay scheme, especially a cooperative relay scheme, to expand cell coverage, increase data throughput, and increase channel capacity.

Meanwhile, the above-described next-generation communication systems require broad-spectrum resources to offer the high-speed, high-capacity services. However, when the broad-spectrum resources are used, a fading effect becomes significant in a wireless channel due to multipath propagation, and an influence of frequency selective fading occurs even in an actual frequency band.

In this case, therefore, a frequency selective fading channel can be divided into a plurality of frequency flat fading channels using OFDM/OFDMA. Here, a communication system using OFDM/OFDMA will be referred to as an OFDM/OFDMA communication system. In the OFDM/OFDMA communication system, all multi-path signals of a signal transmitted by a signal transmission apparatus should be received within a period of a Cyclic Prefix (CP) at a signal reception apparatus to guarantee orthogonality between sub-carriers. If the signal reception apparatus fails to receive all multi-path signals of the transmission signal within the CP period, Inter-Carrier Interference (ICI) occurs in a signal demodulated by the signal reception apparatus, and the ICI makes the signal reception apparatus difficult to estimate the transmission signal.

Particularly, when the OFDM/OFDMA communication system uses the cooperative relay scheme, a signal received at the signal reception apparatus via a Relay Station (RS) may have a long delay time, compared with a signal received at the signal reception apparatus over a direct path between the signal transmission apparatus and the signal reception apparatus. Here, the time required when the signal transmitted by the signal transmission apparatus is received at the signal reception apparatus via the direct path will be called a 'direct-delivery delay time', while the time required when the signal transmitted by the signal transmission apparatus is received at the signal reception apparatus via the RS will be called a 'relay-delivery delay time'. As described above, a signal receiving delay in the OFDM/OFDMA communication system causes ICI, which deteriorates estimation performance for the transmission signal. Thus, deterioration of signal estimation performance due to the signal receiving delay may become more significant when the OFDM/OFDMA communication system uses the cooperative relay scheme. That is, ICI occurrence probability increases because of the long relay-delivery delay time compared with the direct-delivery delay time, and deterioration of signal estimation performance due to the signal receiving delay may become more significant when the OFDM/OFDMA communication system employs the cooperative relay scheme.

Therefore, there is a need for an apparatus and method for transmitting/receiving and estimating signals such that no ICI may occur in the communication system using a broad spectrum.

SUMMARY OF THE INVENTION

An aspect of the present invention is to address at least the above-mentioned problems and/or disadvantages and to provide at least the advantages described below. Accordingly, an aspect of the present invention provides an apparatus and method for transmitting and receiving signals in a DOFDM/DOFDMA communication system.

Another aspect of the present invention provides an apparatus and method for relaying signals in a DOFDM/DOFDMA communication system.

According to one aspect of the present invention, there is provided a signal transmission apparatus in a Double Orthogonal Frequency Division Multiplexing (DOFDM)/Double Orthogonal Frequency Division Multiple Access (DOFMA) communication system. The apparatus includes a row-wised Orthogonal Frequency Division Multiplexing (OFDM) block for generating a first signal by performing row-wised OFDM on M sub-samples for each of N sub-carriers; a column-wised OFDM block for generating a second signal by performing column-wised OFDM on the first signal generated for each of the N sub-carriers; and a transmission unit for transmitting the second signal to a signal reception apparatus. Here, N denotes a number of sub-carriers used in the DOFDM/DOFDMA communication system, and M denotes an integer greater than or equal to 1.

According to another aspect of the present invention, there is provided a signal reception apparatus in a DOFDM/DOFMA communication system. The apparatus includes a column-wised OFDM block for generating N sub-carrier signals by performing column-wised OFDM on a received signal; and a row-wised OFDM block for estimating M sub-samples transmitted by a signal transmission apparatus for each of the N sub-carriers, by performing row-wised OFDM on the N sub-carrier signals. Here, N denotes a number of sub-carriers used in the DOFDM/DOFDMA communication system, and M denotes an integer greater than or equal to 1.

According to further another aspect of the present invention, there is provided a DOFDM/DOFMA communication system including a signal transmission apparatus for generating a first signal by performing first row-wised OFDM on M sub-samples for each of N sub-carriers, generating a second signal by performing first column-wised OFDM on the first signal generated for each of the N sub-carrier, and transmitting the second signal; a signal relaying apparatus for receiving a signal transmitted by the signal transmission apparatus, and relaying the received signal to a signal reception apparatus; and the signal reception apparatus for receiving a cooperative signal including the signal transmitted by the signal transmission apparatus and the signal relayed by the signal relaying apparatus, generating N sub-carrier signals by performing second column-wised OFDM on the received cooperative signal, and estimating M sub-samples transmitted by the signal transmission apparatus for each of the N sub-carriers, by performing second row-wised OFDM on the N sub-carrier signals. Here, N denotes a number of sub-carriers used in the DOFDM/DOFDMA communication system, and M denotes an integer greater than or equal to 1.

According to yet another aspect of the present invention, there is provided a method for transmitting a signal by a signal transmission apparatus in a DOFDM/DOFMA communication system. The method includes generating a first signal by performing row-wised OFDM on M sub-samples for each of N sub-carriers; generating a second signal by performing column-wised OFDM on the first signal generated for each of the N sub-carriers; and transmitting the second signal to a signal reception apparatus. Here, N denotes a number of sub-carriers used in the DOFDM/DOFDMA communication system, and M denotes an integer greater than or equal to 1.

According to still another aspect of the present invention, there is provided a method for receiving a signal by a signal reception apparatus in a DOFDM/DOFMA communication system. The method includes generating N sub-carrier signals by performing column-wised OFDM on a received signal; and estimating M sub-samples transmitted by a signal transmission apparatus for each of the N sub-carrier signals, by performing row-wised OFDM on the N sub-carrier signals. Here, N denotes a number of sub-carriers used in the DOFDM/DOFDMA communication system, and M denotes an integer greater than or equal to 1.

According to still another aspect of the present invention, there is provided a method for relaying a signal in a DOFDM/DOFMA communication system. The method includes generating, by a signal transmission apparatus, a first signal by performing first row-wised OFDM on M sub-samples for each of N sub-carriers, generating a second signal by performing first column-wised OFDM on the first signal generated for each of the N sub-carriers, and transmitting the second signal; receiving, by a signal relaying apparatus, a signal transmitted by the signal transmission apparatus, and relaying the received signal to a signal reception apparatus; and receiving, by the signal reception apparatus, a cooperative signal including the signal transmitted by the signal transmission apparatus and the signal relayed by the signal relaying apparatus, generating N sub-carrier signals by performing the second column-wised OFDM on the received cooperative signal, and estimating M sub-samples transmitted by the signal transmission apparatus for each of the N sub-carriers by performing second row-wised OFDM on the N sub-carrier signals. Here, N denotes a number of sub-carriers used in the DOFDM/DOFDMA communication system, and M denotes an integer greater than or equal to 1.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention provides an apparatus and method for transmitting/receiving and relaying signals in a communication system using Double Orthogonal Frequency Division Multiplexing (DOFDM)/Double Orthogonal Frequency Division Multiple Access (DOFDMA) (hereinafter referred to as "DOFDM/DOFDMA communication system").

Figure 1:
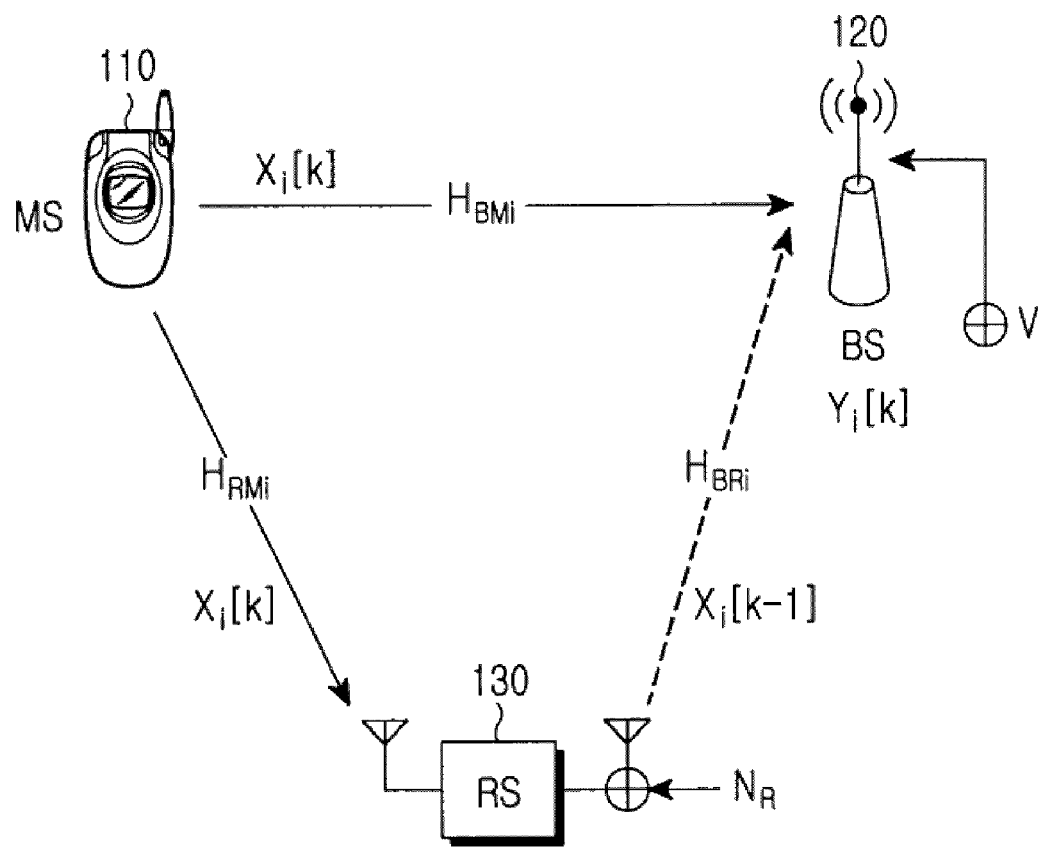
FIG. 1 schematically illustrates a configuration of a DOFDM/DOFDMA communication system using a cooperative relay scheme according to an exemplary embodiment of the present invention.

FIG. 1 schematically illustrates a configuration of a DOFDM/DOFDMA communication system using a cooperative relay scheme according to an exemplary embodiment of the present invention.

Referring to FIG. 1, the DOFDM/DOFDMA communication system includes a Mobile Station (MS) 110, a Base Station (BS) 120, and a Relay Station (RS) 130. Here, the RS 130 is assumed to use a full-duplex scheme, and both the MS 110 and the BS 120 may be either a signal transmission apparatus or a signal reception apparatus. In addition, since the DOFDM/DOFDMA communication system is assumed to use the cooperative relay scheme, a direct path between the MS 110 and the BS 120 is also available even though the RS 130 is installed between the MS 110 and the BS 120. Here, a signal received between the MS 110 and the BS 120 over the direct path between the MS 110 and the BS 120 will be called a 'direct-received signal', while a signal received between the MS 110 and the BS 120 via the RS 130 will be called a 'relay-received signal'.

Besides, a time required when a direct-received signal is received between the MS 110 and the BS 120 over the direct path between the MS 110 and the BS 120 will be called a 'direct-delay time', while a time required when a relay-received signal is received between the MS 110 and the BS 120 via the RS 130 will be called a 'relay-delay time'. Further, a channel between the MS 110 and the BS 120 will be represented by '$H_{BM}$', a channel between the MS 110 and the RS 130 by '$H_{RM}$', and a channel between the RS 130 and the BS 120 by '$H_{BR}$'. All of the $H_{BM}$, $H_{RM}$ and $H_{BR}$ are assumed to be frequency selective fading channels.

In a general communication system that uses Cooperative Relay and OFDM, regarding all frequency selective fading channels of $H_{BM}$, $H_{RM}$ and $H_{BR}$, a signal received over each individual sub-carrier is converted into a flat fading channel, thus making signal receiving processing for each link relatively simple. In addition, a signal reception apparatus can achieve spatial diversity gain and Signal to Noise (SNR) gain, since it receives a direct-received signal and a relay-received signal together.

Meanwhile, in order to ensure orthogonality between sub-carriers, a signal reception apparatus should receive all multi-path signals of a signal transmitted by a signal transmission apparatus within a period of a Cyclic Prefix (CP). If the signal reception apparatus fails to receive all the multi-path signals of the signal transmitted by the signal transmission apparatus within the CP period, Inter-Carrier Interference (ICI) may occur in a signal demodulated by the signal reception apparatus, causing the signal reception apparatus to have difficulty in estimating the signal transmitted by the signal transmission apparatus.

In particular, when a signal reception apparatus receives a signal transmitted by a signal transmission apparatus via the RS 130, the probability may increase that the signal reception apparatus will fail to receive all multi-path signals of the signal transmitted by the signal transmission apparatus within a CP period due to the relay-delay time. In order to prevent the relay-delay time from becoming longer than the CP period in this way, the RS 130 may relay the signal received from the signal transmission apparatus to the signal reception apparatus after delaying it by a preset symbol period, e.g. a 1-OFDM symbol period. However, in this case, all signals relayed by the RS 130 are delayed by a 1-OFDM symbol period, bringing about the result that the signal reception apparatus adds a relay-received signal, which was received a 1-OFDM symbol period ago, to a direct-received signal with regard to each sub-carrier.

When the relay-received signal, which was received a 1-OFDM symbol period ago, is added to the direct-received signal in this way, Inter-Symbol Interference (ISI) may occur regarding each individual sub-carrier at the signal reception apparatus. That is, as the RS 130 delays a signal by a 1-OFDM symbol period during its relay operation, the signal may experience a 2-tap ISI channel regarding each individual sub-carrier. In order to demodulate the signal that underwent the 2-tap ISI channel, the signal reception apparatus should have complex equalizers realized for respective sub-carriers. Besides, the ISI problem makes it difficult to employ various schemes such as Multiple Input Multiple Output (MIMO) and Adaptive Modulation and Coding (AMC), use of which is actively considered in the next-generation communication system.

To address these and other disadvantageous, the present invention proposes DOFDM/DOFDMA, which is a combined scheme of row-wised OFDM and column-wised OFDM. The row-wised OFDM and the column-wised OFDM in each of the signal transmission apparatus and the signal reception apparatus will be described below.

First, the row-wised OFDM and the column-wised OFDM in the signal transmission apparatus will be described below.

When the number of sub-carriers used in the DOFDM/DOFDMA communication system is N, the row-wised OFDM performs M-point Inverse Discrete Fourier Transform (IDFT) on M sub-samples regarding each of N sub-carriers, and inserts a CP in the M-point IDFT-transformed signals. The column-wised OFDM performs N-point IDFT on N sub-carrier signals in which a CP is inserted by the row-wised OFDM, and then inserts a CP into a serial signal generated by Parallel-to-Serial (P/S)-converting the N-point IDFT-transformed signals. M-point IDFT will hereinafter be referred to as M-IDFT, and N-point IDFT as N-IDFT for convenience purpose only.

Second, the row-wised OFDM and the column-wised OFDM in the signal reception apparatus will be described below.

The column-wised OFDM removes a CP from a received signal, and performs N-point Discrete Fourier Transform (DFT) on each of N sub-carrier signals created by Serial to Parallel (S/P)-converting the CP-removed signal. The row-wised OFDM buffers M+$N_{CP}$ samples in each of the signals, which are N-point DFT-transformed by the column-wised OFDM, removes CPs from the buffered signals, and performs M-point DFT on the CP-removed signals. Similarly, N-point DFT will hereinafter be referred to as N-DFT, and M-point DFT as M-DFT for convenience purpose only. Herein, $N_{CP}$ denotes a length of a CP.

A description will be given below of a scenario in which the RS 130 delays a signal transmitted by the signal transmission apparatus by a 1-OFDM symbol period and relays the delayed signal to the signal reception apparatus, without using DOFDM/DOFDMA proposed by the present invention.

When a signal transmission apparatus transmits a signal $X_i[k]$ in a $k^{th}$ OFDM symbol on the basis of an $i^{th}$ sub-carrier, the RS 130 receives the signal $X_i[k]$, delays the received signal $X_i[k]$ by a 1-OFDM symbol, and then relays it to a signal reception apparatus. If the RS 130 delays a signal received from the signal transmission apparatus by a 1-OFDM symbol during its relay operation in this manner, the signal reception apparatus receives a signal $X_i[k-1]$ that the signal transmission apparatus transmitted a 1-OFDM symbol ago. Therefore, the signal received at the signal reception apparatus can be defined as Equation (1).

$$Y_i[k]=H_{BMi}X_i[k]+H_{BRi}X_i[k-1] \quad (1)$$

where $Y_i[k]$ denotes a signal that the signal reception apparatus receives over an $i^{th}$ sub-carrier in a $k^{th}$ OFDM symbol, $X_i[k]$ denotes a signal that the signal transmission apparatus transmits over an $i^{th}$ sub-carrier in a $k^{th}$ OFDM symbol, $H_{BMi}$ denotes an $i^{th}$ sub-carrier's channel matrix between the BS 120 and the MS 110, and $H_{BRi}$ denotes an $i^{th}$ sub-carrier's channel matrix between the BS 120 and the RS 130.

Assuming that M sub-samples are transmitted over each individual sub-carrier, all the $H_{BM}$, $H_{RM}$ and $H_{BR}$ are channel matrixes representing quasi-static channels that are static for an M-OFDM symbol period, and a relation between k and M is $0 \leq k \leq M-1$, a signal the signal reception apparatus receives over an $i^{th}$ sub-carrier can be written as Equation (2).

$$\underbrace{\begin{bmatrix} Y_i[0] \\ Y_i[1] \\ \vdots \\ Y_i[M-2] \\ Y_i[M-1] \end{bmatrix}}_{Y_i} = \underbrace{\begin{bmatrix} H_{BMi} & 0 & \cdots & 0 & 0 \\ H_{BRi} & H_{BMi} & 0 & \cdots & 0 \\ 0 & H_{BRi} & \ddots & \ddots & \vdots \\ \vdots & \vdots & \ddots & H_{BMi} & 0 \\ 0 & \cdots & 0 & H_{BRi} & H_{BMi} \end{bmatrix}}_{H_i} \underbrace{\begin{bmatrix} X_i[0] \\ X_i[1] \\ \vdots \\ X_i[M-2] \\ X_i[M-1] \end{bmatrix}}_{X_i} + \quad (2)$$

$$\underbrace{\begin{bmatrix} v_i[0] \\ v_i[1] \\ \vdots \\ v_i[M-2] \\ v_i[M-1] \end{bmatrix}}_{v_i}$$

Regarding a channel matrix $H_i$ in Equation (2), it is noted that ISI occurs in each individual sub-carrier due to a component of the channel matrix $H_{BRi}$.

Therefore, in the communication system using only the general OFDM, the signal reception apparatus can estimate a signal Xi the signal transmission apparatus transmitted over an $i^{th}$ sub-carrier, using Successive Interference Cancellation (SIC) or Maximum Likelihood Sequence Estimation (MLSE). However, in SIC, if error occurs during estimation of a transmission signal, the error propagates undesirably. In case of MLSE, its processing complexity increases according to a modulation scheme of each sub-sample and the number of multiple paths.

Thus, by using DOFDM/DOFDMA, the present invention can achieve the same gain as compared to converting a channel matrix of a frequency selective fading channel with a circulant matrix form into a channel matrix of a flat fading channel. When DOFDM/DOFDMA is used, Equation (2) can be replaced with Equation (3) below.

$$\underbrace{\begin{bmatrix} Y_i[0] \\ Y_i[1] \\ \vdots \\ Y_i[M-2] \\ Y_i[M-1] \end{bmatrix}}_{Y_i} = \underbrace{\begin{bmatrix} H_{BMi} & 0 & \cdots & 0 & H_{BRi} \\ H_{BRi} & H_{BMi} & 0 & \cdots & 0 \\ 0 & H_{BRi} & \ddots & \ddots & \vdots \\ \vdots & \vdots & \ddots & H_{BMi} & 0 \\ 0 & \cdots & 0 & H_{BRi} & H_{BMi} \end{bmatrix}}_{\tilde{H}_i} \underbrace{\begin{bmatrix} X_i[0] \\ X_i[1] \\ \vdots \\ X_i[M-2] \\ X_i[M-1] \end{bmatrix}}_{X_i} + \quad (3)$$

$$\underbrace{\begin{bmatrix} v_i[0] \\ v_i[1] \\ \vdots \\ v_i[M-2] \\ v_i[M-1] \end{bmatrix}}_{v_i}$$

Equation (3) can be simplified as Equation (4).

$$Y_i = \tilde{H}_i X_i + v_i \quad (4)$$

In Equation (4), $X_i$ equals a signal generated by performing M-IDFT on M sub-samples, and it can be expressed as Equation (5).

$$X_i = F^H G_i \quad (5)$$

where $F^H$ denotes an M-IDFT matrix, a superscript H indicates Hermitian, $G_i$ denotes M sub-samples to be transmitted over an $i^{th}$ sub-carrier, and F denotes an M-DFT matrix. The M-DFT matrix F can be defined as Equation (6).

$$F = \frac{1}{\sqrt{M}} \begin{bmatrix} 1 & 1 & 1 & \cdots & 1 \\ 1 & W_M & W_M^2 & \cdots & W_M^{M-1} \\ \vdots & \vdots & \vdots & \ddots & \vdots \\ 1 & W_M^{M-1} & W_M^{2(M-1)} & \cdots & W_M^{(M-1)^2} \end{bmatrix} \quad (6)$$

where $W_M$ is $e^{-j2\pi/M}$.

If Equation (5) is substituted in Equation (4), the result can be written as Equation (7).

$$Y_i = \tilde{H}_i F^H G_i + V_i \quad (7)$$

Here, it can be appreciated that the channel matrix $\tilde{H}_i$ has a circulant matrix form due to added CPs, unlike the channel matrix shown in Equation (3) for general OFDM, i.e. the channel matrix $H_i$ shown in Equation (2).

Since the channel matrix $\tilde{H}_i$ having a circulant matrix form satisfies a condition of Equation (8) below, it can be decomposed by Eigenvalue Decomposition and given as Equation (9).

$$H_i^H H_i = H_i H_i^H \quad (8)$$

$$\tilde{H}_i = U_i \Lambda_i U_i^H \quad (9)$$

where $\Lambda_i$ denotes a diagonal matrix consisting of eigen values of a channel matrix $\tilde{H}_i$, and $U_i$ denotes a unitary matrix, a column of which consists of an eigen vector. In light of a characteristic of the circulant matrix, since a column of a DFT matrix is equivalent to an eigen vector of the channel matrix $\tilde{H}_i$, the unitary matrix $U_i$ obtained by decomposing a channel matrix $H_i$ using Eigenvalue Decomposition can be replaced with an M-IDFT matrix, i.e. a matrix $F^H$. In order to use the characteristic of replacing the unitary matrix $U_i$ with the matrix $F^H$ due to the characteristic of the circulant matrix, the signal reception apparatus should perform an operation of multiplying the received signal $Y_i$ by the M-DFT matrix F, which can be defined as Equation (10).

$$\hat{Y}_i = FY_i \quad (10)$$
$$= F\tilde{H}_i F^H G_i + Fv_i$$

Equation (10), if Equation (9) is substituted in it, can be given as Equation (11).

$$\hat{Y}_i = FY_i \quad (11)$$
$$= F\tilde{H}_i F^H G_i + Fv_i$$
$$= FU_i \Lambda_i U_i^H F^H G_i + Fv_i$$
$$= FF^H \Lambda_i FF^H G_i + Fv_i$$
$$= \Lambda_i G_i + Z_i$$

That is, when DOFDM/DOFDMA is used, equalization can be simply achieved by converting a 2-tap channel into an M parallel channels, and to express it in matrix form, a diagonal matrix ($\hat{H}_i = \Lambda_i$) can be acquired as shown in Equation (12).

$$\tilde{H}_i = \begin{bmatrix} H_{BMi} & 0 & \cdots & 0 & H_{BRi} \\ H_{BRi} & H_{BMi} & 0 & \cdots & 0 \\ 0 & H_{BRi} & \ddots & \ddots & \vdots \\ \vdots & \vdots & \ddots & H_{BMi} & 0 \\ 0 & \cdots & 0 & H_{BRi} & H_{BMi} \end{bmatrix} \Rightarrow \hat{H} \quad (12)$$
$$= F\hat{H}_i F^H$$
$$= \begin{bmatrix} \hat{H}_{i,0} & 0 & \cdots & 0 & 0 \\ 0 & \hat{H}_{i,1} & 0 & \cdots & 0 \\ 0 & 0 & \ddots & \ddots & \vdots \\ \vdots & \vdots & \ddots & \hat{H}_{i,M-2} & 0 \\ 0 & \cdots & 0 & 0 & \hat{H}_{i,M-1} \end{bmatrix}$$

Meanwhile, in a communication system using general OFDM and Cooperative Relay, a channel matrix $H_i$ is expressed as Equation (13) below, thus making it impossible to convert the channel matrix $H_i$ into a diagonal matrix as in the case where the proposed DOFDM/DOFDMA is used.

$$\tilde{H}_i = \begin{bmatrix} H_{BMi} & 0 & \cdots & 0 & 0 \\ H_{BRi} & H_{BMi} & 0 & \cdots & 0 \\ 0 & H_{BRi} & \ddots & \ddots & \vdots \\ \vdots & \vdots & \ddots & H_{BMi} & 0 \\ 0 & \cdots & 0 & H_{BRi} & H_{BMi} \end{bmatrix} \quad (13)$$

Since the channel matrix $H_i$ does not have a diagonal matrix form as shown in Equation (13), the signal reception apparatus should use only SIC and MLSE to estimate the signal transmitted from the signal transmission apparatus when the general OFDM is used.

Figure 2:
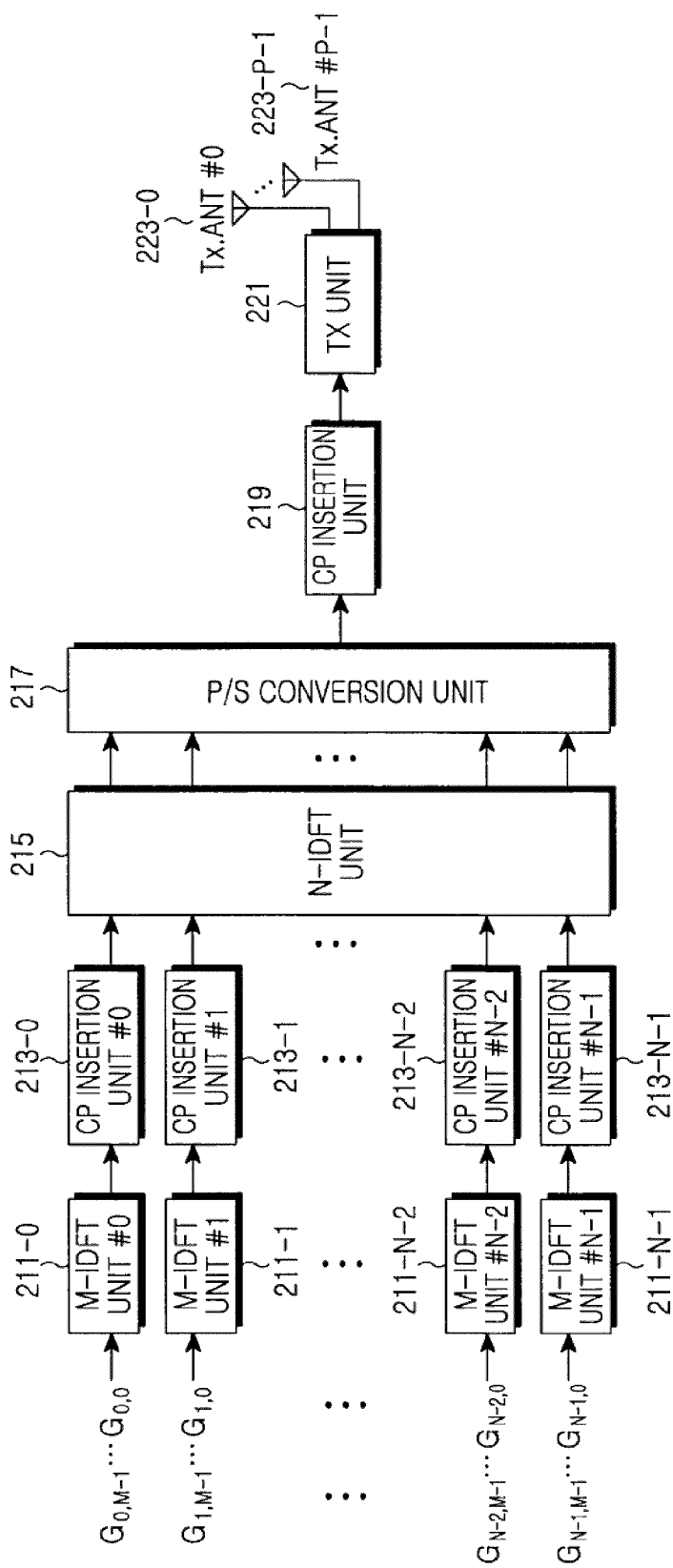
FIG. 2 illustrates a structure of a signal transmission apparatus in a DOFDM/DOFDMA communication system according to an exemplary embodiment of the present invention.

FIG. 2 illustrates a structure of a signal transmission apparatus in a DOFDM/DOFDMA communication system according to an exemplary embodiment of the present invention.

Referring to FIG. 2, the signal transmission apparatus includes N M-IDFTs of an M-IDFT unit #0 211-0 to an M-IDFT unit # N-1 211-N-1, N CP insertion units of a CP insertion unit #0 213-0 to a CP insertion unit #N-1 213-N-1, an N-IDFT unit 215, a P/S conversion unit 217, a CP insertion unit 219, a transmission unit 221, and P transmit antennas Tx.ANT of a transmit antenna #0 223-1 and a transmit antenna #P-1 223-P-1. Among the units included in the signal transmission apparatus, the N M-IDFT units and the N CP insertion units constitute a row-wised OFDM block that uses row-wised OFDM, while the other units constitute a column-wised OFDM block that uses column-wised OFDM.

When M sub-samples to be transmitted are generated for each of the N sub-carriers, the M sub-samples are delivered to their associated M-IDFT unit, for each of the N sub-carriers. Here, M sub-samples to be transmitted over each sub-carrier can be given as Equation (14).

$$\underline{G}_i = G_{i,0}, G_{i,1}, \ldots, G_{i,M-1} \quad (14)$$

Each of the N M-IDFT units performs M-IDFT on M input sub-samples, and outputs the result to its associated CP insertion unit. Then, each of the N CP insertion units inserts a CP in the input M-IDFT-transformed signal, and outputs the result to the N-IDFT unit 215. Here, a length of the CP inserted by each of the N CP insertion units is assumed to be, for example, 1. In this case, each of the N CP insertion units copies an $M^{th}$ sub-sample of a signal output from its associated M-IDFT unit, and inserts it as a CP.

The N-IDFT unit 215 performs N-IDFT on the signals input from the N CP insertion units, and outputs the result to the P/S conversion unit 217. The P/S conversion unit 217 P/S-converts the signals output from the N-IDFT unit 215, and outputs the result to the CP insertion unit 219. The CP insertion unit 219 inserts a CP into the signal output from the P/S conversion unit 217, and outputs the result to the transmission unit 221. The transmission unit 221 performs transmission processing on the signal output from the CP insertion unit 219, and transmits the resulting signal to a signal reception apparatus via the P transmit antennas. Since the transmission processing method has nothing to do with the present invention, a detailed description thereof will be omitted herein. Though the signal transmission apparatus in FIG. 2 has, for example, P transmit antennas, the signal transmission apparatus may use only one transmit antenna.

Figure 3:
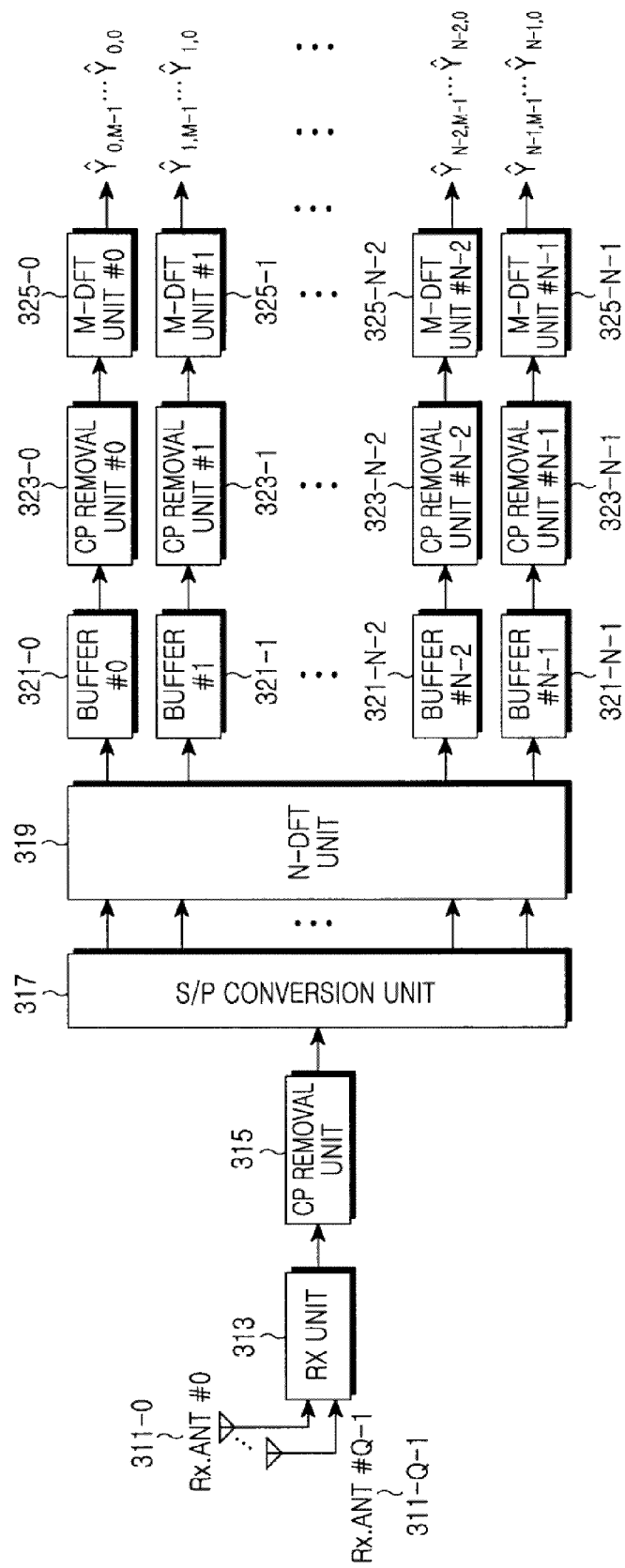
FIG. 3 illustrates a structure of a signal reception apparatus in a DOFDM/DOFDMA communication system according to an exemplary embodiment of the present invention.

FIG. 3 illustrates a structure of a signal reception apparatus in a DOFDM/DOFDMA communication system according to an exemplary embodiment of the present invention.

Referring to FIG. 3, the signal reception apparatus includes Q receive antennas Rx.ANT of a receive antenna #0 311-0 and a receive antenna #Q-1 311-Q-1, a reception unit 313, a CP removal unit 315, an S/P conversion unit 317, an N-DFT unit 319, N buffers of a buffer #0 321-0 to a buffer #N-1 321-N-1, N CP removal units of a CP removal unit #0 323-0 to a CP removal unit #N-1 323-N-1, and N M-DFT units of an M-DFT unit #0 323-0 to an M-DFT unit #N-1 323-N-1. Among the units included in the signal reception apparatus, the CP removal unit 315, the S/P conversion unit 317 and the N-DFT unit 319 constitute a column-wised OFDM block that uses column-wised OFDM, while the other units constitute a row-wised OFDM block that uses row-wised OFDM.

A signal received via the Q receive antennas is delivered to the reception unit 313, and the reception unit 313 performs reception processing on the received signal, and outputs the result to the CP removal unit 315. The reception processing method has nothing to do with the present invention, so a detailed description thereof is omitted herein. Though the signal reception apparatus in FIG. 3 includes, for example, Q receive antennas, the signal reception apparatus may use only one receive antenna.

The CP removal unit 315 removes a CP from the signal output from reception unit 313, and outputs the result to the S/P conversion unit 317. Here, a length of the CP removed by the CP removal unit 315 is equal to a length of the CP inserted by the CP insertion unit 219 in the signal transmission apparatus. The S/P conversion unit 317 S/P-converts the signal output from the CP removal unit 315, and outputs the result to the N-DFT unit 319. The N-DFT unit 319 performs N-DFT on the signals output from the S/P conversion unit 317, and outputs the resulting signals to the N buffers. Each of the N buffers performs buffering on the signal output from the N-DFT unit 319 for a period corresponding to a length of M+$N_{CP}$, and then outputs the result to its associated CP removal unit. Each of the N CP removal units removes a CP from the signal output from its associated buffer, and outputs the result to its associated M-DFT unit. Here, a length of the CP removed by each of the N CP removal units is 1, because a length of the CP inserted by each of the N CP insertion units in the signal transmission apparatus is 1. Each of the N M-DFT units performs M-DFT on the signal output from its associated CP removal unit to estimate the signal that the signal transmission apparatus transmitted over the associated sub-carrier. Here, the signal output from each of the N M-DFT units can be given as Equation (15).

$$\underline{\hat{Y}}_i = \hat{Y}_{i,M-1}, \hat{Y}_{i,M-2}, \ldots, \hat{Y}_{i,0} \quad (15)$$

Figure 4:
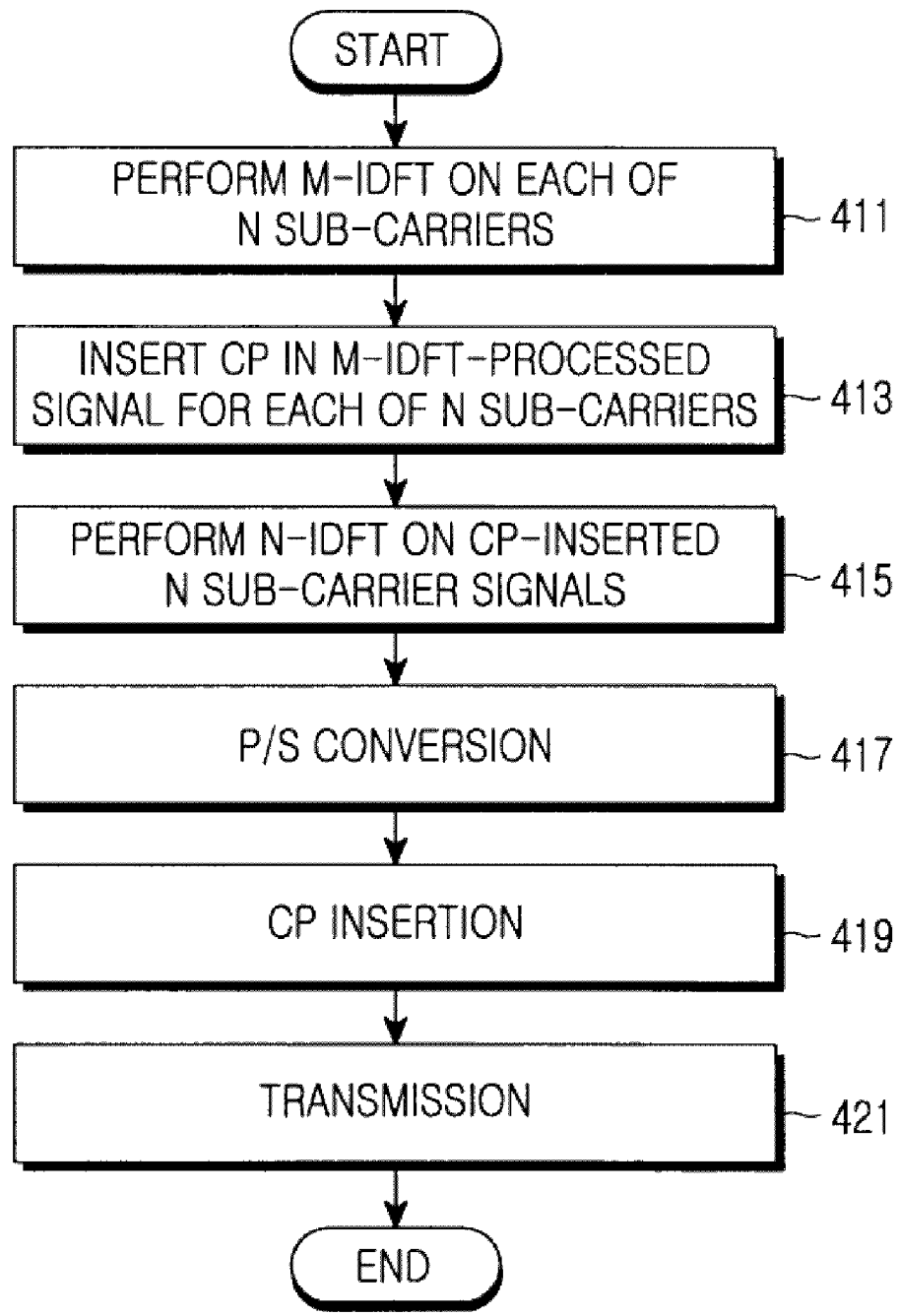
FIG. 4 is a flowchart illustrating an operation of a signal transmission apparatus in a DOFDM/DOFDMA communication system according to an exemplary embodiment of the present invention.

FIG. 4 is a flowchart illustrating an operation of a signal transmission apparatus in a DOFDM/DOFDMA communication system according to an exemplary embodiment of the present invention.

Referring to FIG. 4, when M sub-samples to be transmitted over each of N sub-carriers are generated, the signal transmission apparatus performs M-IDFT on the M sub-samples to be transmitted over each of the N sub-carriers, in step 411, and inserts a CP into the M-IDFT-transformed signal for each of the N sub-carriers in step 413. The signal transmission apparatus performs N-IDFT on the CP-inserted N sub-carrier signals in step 415, P/S-converts the N-IDFT-transformed signal in step 417, and inserts a CP in the P/S-converted signal in step 419. Thereafter, in step 421, the signal transmission apparatus performs transmission processing on the CP-inserted signal, and transmits the resulting signal to a signal reception apparatus.

Figure 5:
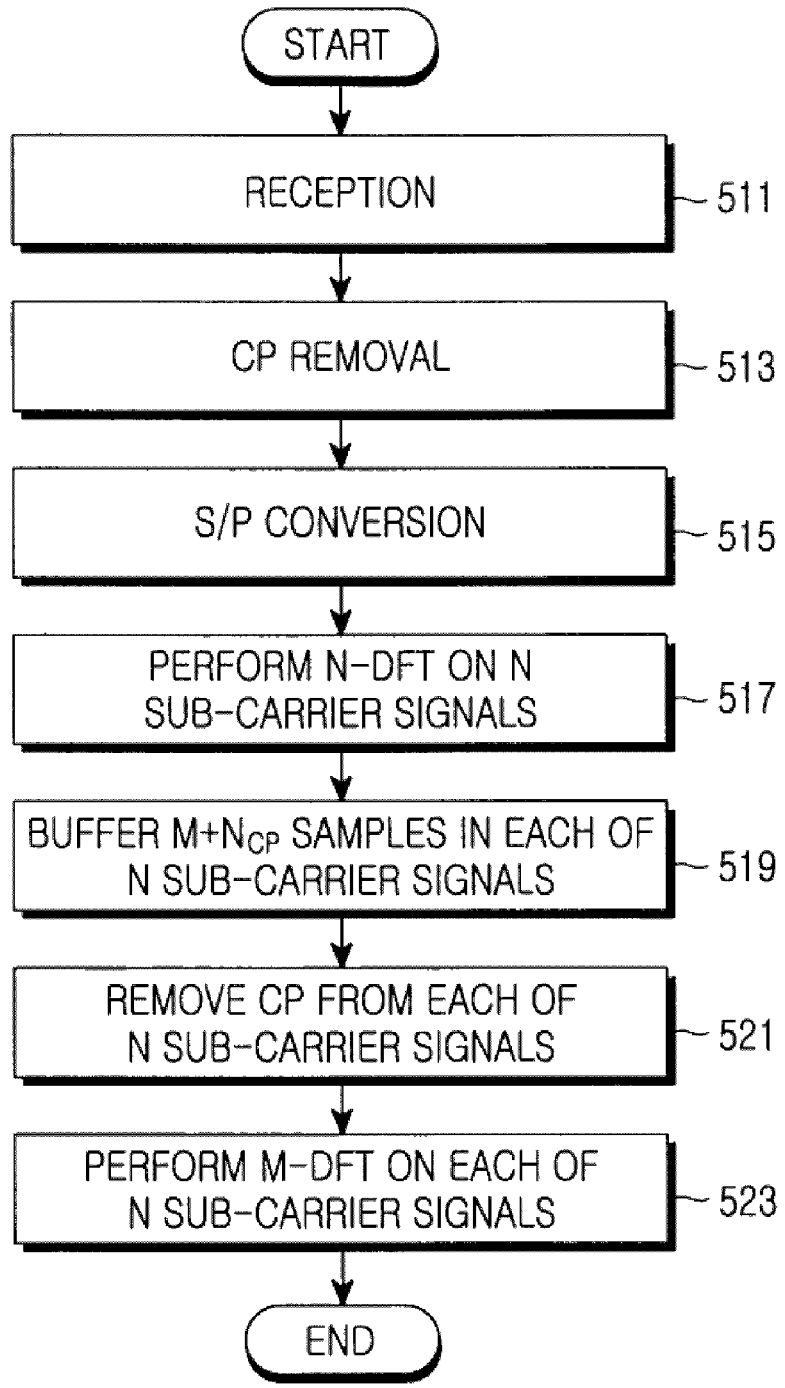
FIG. 5 is a flowchart illustrating an operation of a signal reception apparatus in a DOFDM/DOFDMA communication system according to an exemplary embodiment of the present invention.

FIG. 5 is a flowchart illustrating an operation of a signal reception apparatus in a DOFDM/DOFDMA communication system according to an exemplary embodiment of the present invention.

Referring to FIG. 5, the signal reception apparatus performs reception processing on a received signal in step 511, removes a CP from the reception-processed signal in step 513, and S/P-converts the CP-removed signal in step 515. The signal reception apparatus performs N-DFT on the S/P-converted N sub-carrier signals in step 517, and buffers M+$N_{CP}$ samples in each of the N sub-carrier signals in step 519. In step 521, the signal reception apparatus removes a CP from the buffered M+$N_{CP}$ samples with regard to each of the N sub-carriers. In step 523, the signal reception apparatus performs M-DFT on the CP-removed signal for each of the N sub-carriers to estimate the signal transmitted from the signal transmission apparatus.

So far, the apparatus and method for transmitting/receiving and relaying signals has been described in connection with IDFT and DFT, by way of example. However, Inverse Fast Fourier Transform (IFFT) and Fast Fourier Transform (FFT) may be used in place of IDFT and DFT, respectively.

As is apparent from the foregoing description, the present invention provides an apparatus and method for transmitting/receiving and relaying signals in a DOFDM/DOFDMA communication system, thereby preventing ICI occurrence due to a delay caused by the use of a broad spectrum and thus improving the entire system performance.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a signal by a signal transmission apparatus in a Double Orthogonal Frequency Division Multiplexing (DOFDM)/Double Orthogonal Frequency Division Multiple Access (DOFDMA) communication system, the method comprising:
    performing M-point Inverse Discrete Fourier Transform (M-IDFT) on M sub-samples for each of N sub-carriers;
    generating a first signal by inserting a Cyclic Prefix (CP) with a first length into the M-IDFT-processed signal;
    performing N-point IDFT (N-IDFT) on the first signal generated for each of the N sub-carriers;
    parallel-to-serial converting the N-IDFT-processed signal;
    generating a second signal by inserting a CP with a second length into the parallel-to-serial converted signal; and
    transmitting the second signal to a signal reception apparatus,
    wherein N denotes a number of sub-carriers used in the DOFDM/DOFDMA communication system, and M denotes an integer greater than or equal to 1.

2. A method for receiving a signal by a signal reception apparatus in a Double Orthogonal Frequency Division Multiplexing (DOFDM)/Double Orthogonal Frequency Division Multiple Access (DOFDMA) communication system, the method comprising:
    generating N sub-carrier signals by performing column-wised Orthogonal Frequency Division Multiplexing (OFDM) on a received signal; and
    estimating M sub-samples transmitted by a signal transmission apparatus for each of the N sub-carrier signals, by performing row-wised OFDM on the N sub-carrier signals,
    wherein the generation of N sub-carrier signals comprises:
    removing a Cyclic Prefix (CP) with a first length from the received signal; and
    generating the N sub-carrier signals by serial-to-parallel converting the signal from which the CP with the first length is removed,
    wherein the estimation of M sub-samples comprises:
    buffering M+$N_{CP}$ samples in each of the N sub-carrier signals;
    removing a CP with a second length from the M+$N_{CP}$ samples, which are buffered for each of the N sub-carrier signals;
    estimating M sub-samples transmitted by the signal transmission apparatus for each of the N sub-carrier signals by performing M-point Discrete Fourier Transform (DFT) on each of the N sub-carrier signals from which the CP with the second length is removed,
    wherein N denotes a number of sub-carriers used in the DOFDM/DOFDMA communication system, and M denotes an integer greater than or equal to 1, and
    wherein the second length is $N_{CP}$ and $N_{CP}$ denotes a length of the CP.

3. A method for relaying a signal in a Double Orthogonal Frequency Division Multiplexing (DOFDM)/Double Orthogonal Frequency Division Multiple Access (DOFDMA) communication system, the method comprising:
    generating, by a signal transmission apparatus, a first signal by performing first row-wised Orthogonal Frequency Division Multiplexing (OFDM) on M sub-samples for each of N sub-carriers, generating a second signal by performing first column-wised OFDM on the first signal generated for each of the N sub-carriers, and transmitting the second signal;

receiving, by a signal relaying apparatus, a signal transmitted by the signal transmission apparatus, and relaying the received signal to a signal reception apparatus; and receiving, by the signal reception apparatus, a cooperative signal including the signal transmitted by the signal transmission apparatus and the signal relayed by the signal relaying apparatus, generating N sub-carrier signals by performing second column-wised OFDM on the received cooperative signal, and estimating M sub-samples transmitted by the signal transmission apparatus for each of the N sub-carriers by performing second row-wised OFDM on the N sub-carrier signals, wherein the generation of a first signal comprises:

performing M-point Inverse Discrete Fourier Transform (M-IDFT) on the M sub-samples for each of the N sub-carriers; and generating the first signal by inserting a Cyclic Prefix (CP) with a first length into the M-IDFT-processed signal for each of the N sub-carriers, wherein the generation of a second signal comprises:

performing N-point IDFT (N-IDFT) on the first signal generated for each of the N sub-carriers;

parallel-to-serial converting the N-IDFT-processed signal; and generating the second signal by inserting a CP with a second length into the parallel-to-serial converted signal, wherein the generation of N sub-carrier signals comprises:

removing a CP with a first length from the received cooperative signal; and generating the N sub-carrier signals by serial-to-parallel converting the signal from which the CP with the first length is removed, wherein the estimation of M sub-samples comprises:

buffering $M+N_{CP}$ samples in each of the N sub-carrier signals;

removing a CP with a second length from the $M+N_{CP}$ samples, which are buffered for each of the N sub-carrier signals; and estimating M sub-samples transmitted by the signal transmission apparatus for each of the N sub-carriers by performing M-point DFT (M-DFT) on each of the N sub-carrier signals from which the CP with the second length is removed, wherein N denotes a number of sub-carriers used in the DOFDM/DOFDMA communication system, and M denotes an integer greater than or equal to 1, and wherein the second length is $N_{CP}$ and $N_{CP}$ denotes a length of the CP.

4. The method of claim 3, wherein the received cooperative signal is defined as;

$$\underbrace{\begin{bmatrix} Y_i[0] \\ Y_i[1] \\ \vdots \\ Y_i[M-2] \\ Y_i[M-1] \end{bmatrix}}_{Y_i} = \underbrace{\begin{bmatrix} H_{BMi} & 0 & \cdots & 0 & H_{BRi} \\ H_{BRi} & H_{BMi} & 0 & \cdots & 0 \\ 0 & H_{BRi} & \ddots & \ddots & \vdots \\ \vdots & \vdots & \ddots & H_{BMi} & 0 \\ 0 & \cdots & 0 & H_{BRi} & H_{BMi} \end{bmatrix}}_{\tilde{H}_i} \underbrace{\begin{bmatrix} X_i[0] \\ X_i[1] \\ \vdots \\ X_i[M-2] \\ X_i[M-1] \end{bmatrix}}_{X_i} + \underbrace{\begin{bmatrix} v_i[0] \\ v_i[1] \\ \vdots \\ v_i[M-2] \\ v_i[M-1] \end{bmatrix}}_{v_i}$$

where $\tilde{H}_i$ denotes a channel matrix in an $i^{th}$ sub-carrier, $Y_i[k]$ denotes a signal received over an $i^{th}$ sub-carrier in a $k^{th}$ OFDM symbol period, $H_{BMi}$ denotes an $i^{th}$ sub-carrier's channel matrix between the signal transmission apparatus and the signal reception apparatus, $H_{BRi}$ denotes an $i^{th}$ sub-carrier's channel matrix between the signal transmission apparatus and the signal relaying apparatus, and $X_i[k]$ denotes a signal that the signal transmission apparatus transmitted over an $i^{th}$ sub-carrier in a $k^{th}$ OFDM symbol period.

5. The method of claim 4, wherein the channel matrix $\hat{H}_i$ is expressed as a diagonal matrix $\hat{H}_i = \Lambda_i$ defined as;

$$\hat{H} = F\tilde{H}_i F^H = \begin{bmatrix} \hat{H}_{i,0} & 0 & \cdots & 0 & 0 \\ 0 & \hat{H}_{i,1} & 0 & \cdots & 0 \\ 0 & 0 & \ddots & \ddots & \vdots \\ \vdots & \vdots & \ddots & \hat{H}_{i,M-2} & 0 \\ 0 & \cdots & 0 & 0 & \hat{H}_{i,M-1} \end{bmatrix}$$

where F denotes an M-DFT matrix, $F^H$ denotes an M-IDFT matrix, and a superscript H indicates Hermitian.

6. A signal transmission apparatus in a Double Orthogonal Frequency Division Multiplexing (DOFDM)/Double Orthogonal Frequency Division Multiple Access (DOFDMA) communication system, the apparatus comprising:

a row-wised Orthogonal Frequency Division Multiplexing (OFDM) block for generating a first signal by performing row-wised OFDM on M sub-samples for each of N sub-carriers;

a column-wised OFDM block for generating a second signal by performing column-wised OFDM on the first signal generated for each of the N sub-carriers; and a transmission unit for transmitting the second signal to a signal reception apparatus, wherein the row-wised OFDM block comprises:

N M-IDFT units for performing M-point Inverse Discrete Fourier Transform (M-IDFT) on the M sub-samples; and N first Cyclic Prefix (CP) insertion units for generating the first signal by inserting a CP with a first length into the M-IDFT-processed signal, wherein the column-wised OFDM block comprises:

an N-IDFT unit for performing N-point IDFT (N-IDFT) on the first signal generated by each of the N first CP insertion units;

a parallel-to-serial conversion unit for parallel-to-serial converting the N-IDFT-processed signal; and a second CP insertion unit for generating the second signal by inserting a CP with a second length into the parallel-to-serial converted signal, wherein N denotes a number of sub-carriers used in the DOFDM/DOFDMA communication system, and M denotes an integer greater than or equal to 1.

7. A signal reception apparatus in a Double Orthogonal Frequency Division Multiplexing (DOFDM)/Double Orthogonal Frequency Division Multiple Access (DOFDMA) communication system, the apparatus comprising:
- a column-wised Orthogonal Frequency Division Multiplexing (OFDM) block for generating N sub-carrier signals by performing column-wised OFDM on a received signal; and
- a row-wised OFDM block for estimating M sub-samples transmitted by a signal transmission apparatus for each of the N sub-carriers, by performing row-wised OFDM on the N sub-carrier signals, wherein the column-wised OFDM block comprises:
a first Cyclic Prefix (CP) removal unit for removing a CP with a first length from the received signal; and
a serial-to-parallel conversion unit for generating the N sub-carrier signals by serial-to-parallel converting the signal from which the CP with the first length is removed, wherein the row-wised OFDM block comprises:
N buffers for buffering M+$N_{CP}$ samples in input sub-carrier signals;
N second CP removal units for removing a CP with a second length from the buffered M+$N_{CP}$ samples; and
N M-DFT units for estimating M sub-samples transmitted over associated sub-carriers by the signal transmission apparatus by performing M-point DFT (M-DFT) on the signals from which the CP with the second length is removed, wherein N denotes a number of sub-carriers used in the DOFDM/DOFDMA communication system, and M denotes an integer greater than or equal to 1, and
wherein the second length is $N_{CP}$ and $N_{CP}$ denotes a length of the CP.

8. A Double Orthogonal Frequency Division Multiplexing (DOFDM)/Double Orthogonal Frequency Division Multiple Access (DOFDMA) communication system, comprising:
- a signal transmission apparatus for generating a first signal by performing first row-wised Orthogonal Frequency Division Multiplexing (OFDM) on M sub-samples for each of N sub-carriers, generating a second signal by performing first column-wised OFDM on the first signal generated for each of the N sub-carrier, and transmitting the second signal;
- a signal relaying apparatus for receiving a signal transmitted by the signal transmission apparatus, and relaying the received signal to a signal reception apparatus; and
- the signal reception apparatus for receiving a cooperative signal including the signal transmitted by the signal transmission apparatus and the signal relayed by the signal relaying apparatus, generating N sub-carrier signals by performing second column-wised OFDM on the received cooperative signal, and estimating M sub-samples transmitted by the signal transmission apparatus for each of the N sub-carriers, by performing second row-wised OFDM on the N sub-carrier signals, wherein the signal transmission apparatus performs M-point Inverse Discrete Fourier Transform (M-IDFT) on the M sub-samples for each of the N sub-carriers, and generates the first signal by inserting a Cyclic Prefix (CP) with a first length into an M-IDFT-processed signal for each of the N sub-carriers,
wherein the signal transmission apparatus performs N-point IDFT (N-IDFT) on the first signal generated for each of the N sub-carriers, parallel-to-serial converts the N-IDFT-processed signal, and generates the second signal by inserting a CP with a second length into the parallel-to-serial converted signal, wherein the signal reception apparatus removes a CP with a first length from the received cooperative signal, and generates the N sub-carrier signals by serial-to-parallel converting the signal from which the CP with the first length is received,
wherein the signal reception apparatus buffers M+$N_{CP}$ samples in each of the N sub-carrier signals, removes a CP with a second length from the M+$N_{CP}$ samples, which are buffered for each of the N sub-carrier signals, and estimates M sub-samples transmitted by the signal transmission apparatus for each of the N sub-carriers by performing M-point DFT (M-DFT) on each of the N sub-carrier signals from which the CP with the second length is removed,
wherein N denotes a number of sub-carriers used in the DOFDM/DOFDMA communication system, and M denotes an integer greater than or equal to 1, and
wherein the second length is $N_{CP}$ and $N_{CP}$ denotes a length of the CP.

9. The DOFDM/DOFDMA communication system of claim 8, wherein the received cooperative signal is defined as;

$$\underbrace{\begin{bmatrix} Y_i[0] \\ Y_i[1] \\ \vdots \\ Y_i[M-2] \\ Y_i[M-1] \end{bmatrix}}_{Y_i} = \underbrace{\begin{bmatrix} H_{BMi} & 0 & \cdots & 0 & H_{BRi} \\ H_{BRi} & H_{BMi} & 0 & \cdots & 0 \\ 0 & H_{BRi} & \ddots & \ddots & \vdots \\ \vdots & \vdots & \ddots & H_{BMi} & 0 \\ 0 & \cdots & 0 & H_{BRi} & H_{BMi} \end{bmatrix}}_{\tilde{H}_i} \underbrace{\begin{bmatrix} X_i[0] \\ X_i[1] \\ \vdots \\ X_i[M-2] \\ X_i[M-1] \end{bmatrix}}_{X_i} + \underbrace{\begin{bmatrix} v_i[0] \\ v_i[1] \\ \vdots \\ v_i[M-2] \\ v_i[M-1] \end{bmatrix}}_{v_i}$$

where $\tilde{H}_i$ denotes a channel matrix in an $i^{th}$ sub-carrier, $Y_i[k]$ denotes a signal received over an $i^{th}$ sub-carrier in a $k^{th}$ OFDM symbol period, $H_{BMi}$ denotes an $i^{th}$ sub-carrier's channel matrix between the signal transmission apparatus and the signal reception apparatus, $H_{BRi}$ denotes an $i^{th}$ sub-carrier's channel matrix between the signal transmission apparatus and the signal relaying apparatus, and $X_i[k]$ denotes a signal that the signal transmission apparatus transmitted over an $i^{th}$ sub-carrier in a $k^{th}$ OFDM symbol period.

10. The DOFDM/DOFDMA communication system of claim 9, wherein the channel matrix $\tilde{H}_i$ is expressed as a diagonal matrix $\hat{H}_i = \Lambda_i$ defined as;

$$\hat{H} = F\tilde{H}_i F^H = \begin{bmatrix} \hat{H}_{i,0} & 0 & \cdots & 0 & 0 \\ 0 & \hat{H}_{i,1} & 0 & \cdots & 0 \\ 0 & 0 & \ddots & \ddots & \vdots \\ \vdots & \vdots & \ddots & \hat{H}_{i,M-2} & 0 \\ 0 & \cdots & 0 & 0 & \hat{H}_{i,M-1} \end{bmatrix}$$

where F denotes an M-DFT matrix, $F^H$ denotes an M-IDFT matrix, and a superscript H indicates Hermitian.

* * * * *